INVENTOR.
RALPH H. SCOTT
By Donald G. Dalton
Attorney

INVENTOR.
RALPH H. SCOTT
By Donald G. Dalton
Attorney

United States Patent Office

3,444,458
Patented May 13, 1969

1

3,444,458
DEVICE FOR DETECTING VARIATIONS IN MAGNETIC PROPERTIES OF FERROMAGNETIC MATERIAL
Ralph H. Scott, Bristol Township, Bucks County, Pa. (62 Oldbrook Road, Levittown, Pa. 19057)
Filed Nov. 21, 1966, Ser. No. 595,858
Int. Cl. H03j 1/04, 3/14
U.S. Cl. 324—34    1 Claim

ABSTRACT OF THE DISCLOSURE

A device which continuously indicates changes in the magnetic properties of a ferromagnetic material, such as steel strip. Includes two confronting magnetic cores with a gap between them to receive a ferromagnetic specimen. The ends of the cores carry pickup windings or equivalent means, in which signals are induced in accordance with the reluctance between the cores. Signals go to a recorder, which shows when a change occurs. The device may be used in a processing line for steel strip for indicating changes in magnetic properties of the strip without interfering with normal operation of the line. A change in magnetic properties usually indicates a change in the chemical or metallurgical properties. Thus the device enables an improper operating condition to be corrected promptly.

---

This invention relates to an improved device for detecting variations in the magnetic properties of ferromagnetic material, such as steel.

Although the invention is not thus limited, the device is particularly useful as a means for detecting variations in the quality of continuous steel strip moving in a processing line. It is known that the magnetic properties of steel strip change with changes in its metallurgical and physical properties. A change in magnetic properties usually indicates a change has occurred in one or more other variables, such as the mechanical hardness, gauge, grain structure, stress relief of work-hardened strip, uniformity of annealing or the like. It is difficult to observe such changes while a strip is being processed, and a large quantity of defective strip may be produced before an improper condition is corrected. Nevertheless it is apparent the invention has broader application, as for example, checking specimens of flat-rolled steel or other ferromagnetic material in a laboratory.

An object of the invention is to provide an improved and simplified device which can detect variations in magnetic properties of ferromagnetic material without contacting the material and which I can use with rapidly moving material without interfering with movement thereof.

A further object is to provide such a device which affords a completely non-destructive test.

A more specific object is to provide a detecting device of the foregoing type which includes a pair of matched magnetic cores to be placed on opposite sides of a specimen of ferromagnetic material, such as steel strip, and pickup windings or Hall generators on said cores, the magnitude of signals from said windings or generators affording an indication of the magnetic properties of the material.

Figure 1:
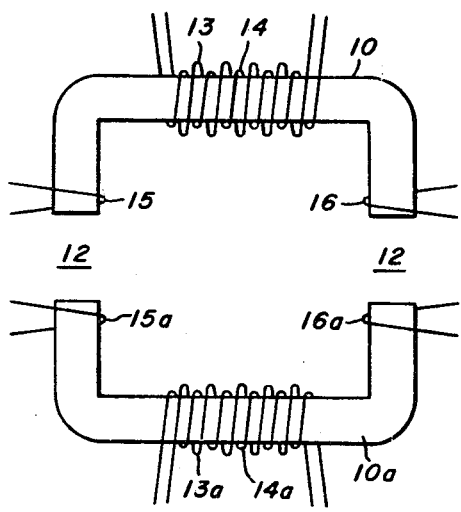
FIGURE 1 is a diagrammatic side elevational view of the matched cores and windings embodied in one form of my invention.
Figure 3:
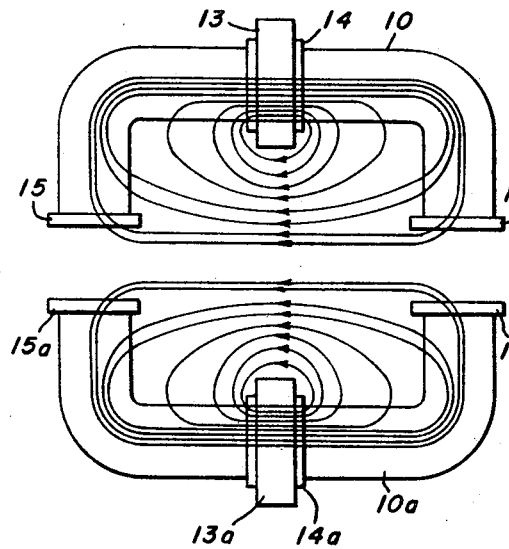
FIGURE 3 is a diagrammatic side elevation illustrating
Figure 4:
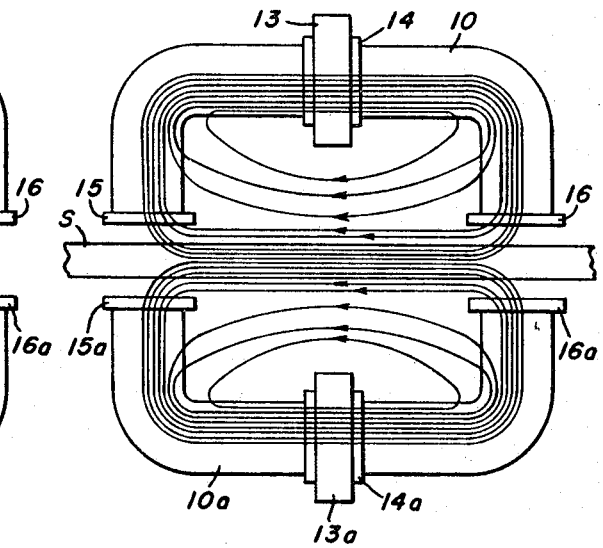
Figure 5:
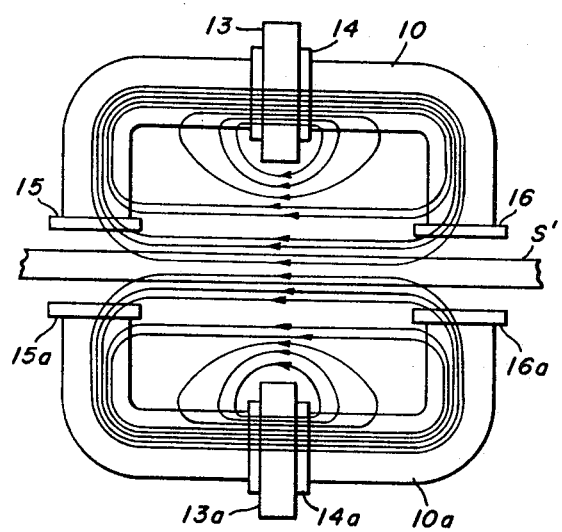
Figure 6:
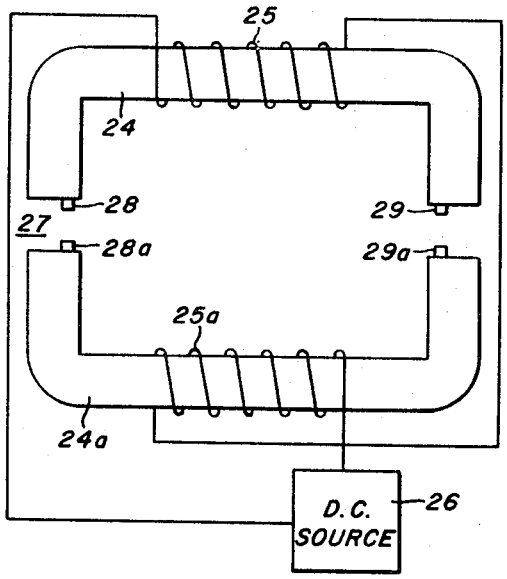
Figure 7:
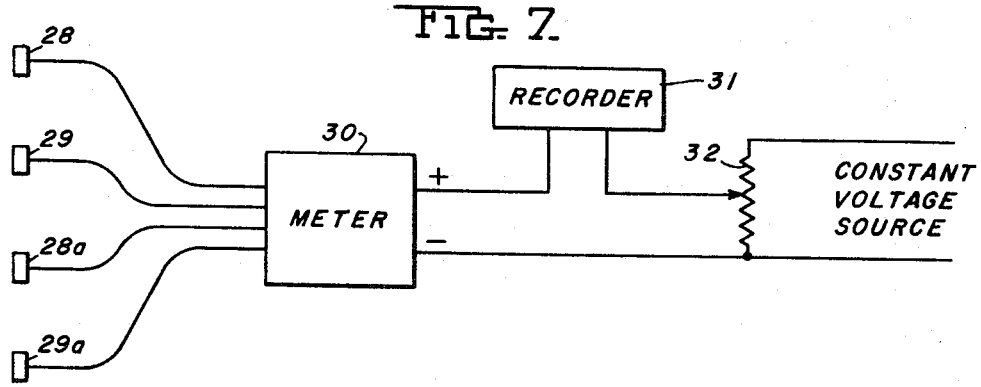

2 a typical pattern of the lines of magnetic force through the cores of FIGURE 1 in the absence of a test specimen;

FIGURE 4 is a view similar to FIGURE 3 but showing a soft steel test specimen;

FIGURE 5 is another similar view showing a hard steel test specimen;

FIGURE 6 is a diagrammatic side elevational view of a modified form of my invention;

FIGURE 7 is a schematic wiring diagram of the form shown in FIGURE 6; and

Figure 8:
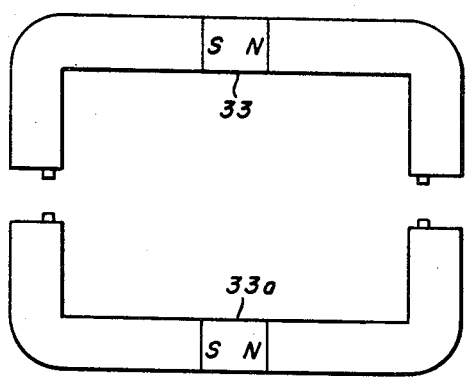

FIGURE 8 is a diagrammatic side elevational view of another modified form of my invention.

In the form shown in FIGURES 1 to 5, my detecting device includes two opposed U-shaped cores 10 and 10a of like construction. The cores are of magnetic material, such as soft iron or tape-wound grain-oriented silicon steel split into two identical halves. I support the cores with any suitable means, not shown, to align the two ends of one with the ends of the other but with a gap 12 between them. The central portion of core 10 carries a primary winding 13 and a reference winding 14. The core also carries means for indicating reluctance at its ends. I can use various means for this purpose, but my preferred means includes pickup windings 15 and 16 carried on the core as close as possible to its respective ends. Core 10a carries similar primary, reference and pickup windings 13a, 14a, 15a and 16a. In one example each primary winding has 300 turns of No. 18 magnet wire, each reference winding 60 turns of No. 18 wire, and each pickup winding 50 turns of No. 26 wire.

Figure 2:
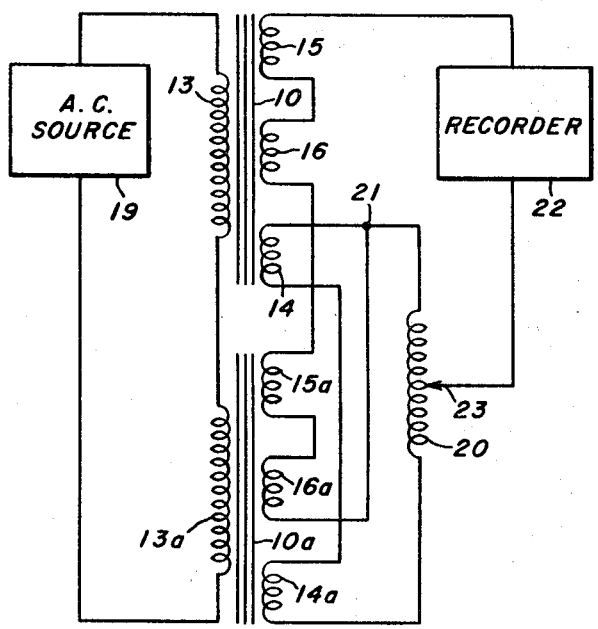
FIGURE 2 is a schematic wiring diagram of the form shown in FIGURE 1.

As FIGURE 2 shows, I connect the two primary windings 13 and 13a in series across an A-C voltage source 19 of constant frequency or repetition rate, amplitude and wave shape. The source may be held either at constant voltage or constant current, but with an A-C source I prefer constant voltage. I connect the two reference windings 14 and 14a in series across the ends of an autotransformer winding 20. I also connect the four pickup windings 15, 16, 15a and 16a in series. I connect one end of the series of pickup windings to a junction point 21 located between the reference winding 14 and the autotransformer winding 20. I connect the other end of the series of pickup windings to a recorder 22. I connect the other side of the recorder to an arm 23 which contacts the autotransformer winding 20 and is adjustable along the length thereof. I have not shown details of the voltage source 19, autotransformer 20 and recorder 22, since these are well-known devices per se and are available commercially.

Current in the primary windings 13 and 13a induces magnetic flux in cores 10 and 10a in a direction that the aligned ends of the cores have instantaneous like polarity. This flux induces A-C signals in the reference windings 14 and 14a and in the pickup windings 15, 16 15a and 16a. I connect these windings so that the signals induced in the two reference windings add, and the signals induced in the four pickup windings add. I connect one end of the series of pickup windings to the end of the autotransformer 20 at junction point 21 so that the reference signal developed across the segment of the autotransformer between junction point 21 and arm 23 opposes the pickup signal.

FIGURE 3 shows the approximate pattern the magnetic lines of force follow when the primary windings 13 and 13a are energized in the absence of a test specimen. The two cores 10 and 10a repel each other, since their like poles are confronting. There is a relatively high reluctance through the gap 12. Relatively few lines of magnetic force pass between the ends of the cores and cut the pickup windings 15, 16, 15a and 16a. I adjust the position of arm 23 along the autotransformer winding 20 so that the recorder 22 shows a null reading when no specimen is present. The fraction of the reference signal used is now equal and opposite to the pickup signal, thus eliminating the "air signal."

When I place a specimen S of soft steel within gap 12, as FIGURE 4 shows, the reluctance between the poles becomes much lower. More lines of magnetic force cut the pickup windings 15, 16, 15a and 16a and induce larger signals therein. Recorder 22 shows a reading which remains constant as long as the physical and metallurgical properties of the specimen remain constant. When the specimen is a strip moving in a processing line, any deviation in the recorder reading indicates a change in some property of the strip. A correction may be needed in the operation of the line, and this fact at once becomes known. When I place a specimen S' of harder steel within gap 12, as FIGURE 5 shows, the reluctance between the poles is greater than with the soft steel, but again should remain constant.

FIGURE 6 shows a modified device which includes cores 24 and 24a similar to the cores already described, but carrying only primary windings 25 and 25a around their central portions. I connect these windings in series across a constant current D-C source 26. I align these cores with a gap 27 between them as in the form already described, whereby the confronting ends have like polarity. Again I may use various means for indicating reluctance at the ends of the cores, but my preferred means with a D-C source includes small Hall generators 28, 29, 28a and 29a mounted on the ends of the two cores. As FIGURE 7 shows, I connect these generators to a meter 30 which adds their output signals. I connect this meter to a recorder 31 and an opposing adjustable constant voltage D-C source 32, which serves as a reference. The operation of the modified form is similar to that already described. I adjust the voltage source 32 so that the recorder shows a null signal in the absence of a test specimen. When I place a specimen in the gap 27, the Hall generators produce D-C signals, the magnitude of which depends on the reluctance between the cores. I have not shown details of the Hall generators nor the meter for adding their output signals, since these are well-known devices per se and are available commercially. Nevertheless reference can be made to a printed publication entitled "How to Magnetize, Measure and Stabilize Permanent Magnets," by Radio Frequency Labs, Inc., Boonton, N.J., for a description of Hall generators.

FIGURE 8 shows another modification which is similar to FIGURE 6, except that I use permanent magnets 33 and 33a to supply flux to the cores. The arrangement of Hall generators and the recorder circuit is identical to that shown in FIGURES 6 and 7; hence I have not repeated the showing.

From the foregoing description it is seen that my invention affords a simple device which immediately indicates a change in properties of flat-rolled steel product. Thus the device enables prompt correction of operating conditions which have led to an undesired change in the product. The device avoids the need for more cumbersome apparatus or time-consuming tests. When I use the device on a strip-processing line, readings are independent of the strip speed. Variations in the strip speed make no significant difference in the operation of the device, no matter whether the strip moves fast or slowly or even is stationary.

I claim:
1. A device for detecting variations in the magnetic properties of ferromagnetic material comprising:
   a pair of U-shaped cores of magnetic material supported with the ends of one core aligned with the ends of the other core and a gap between the cores for receiving a test specimen;
   respective primary windings around the central portions of said cores;
   an A-C source of constant frequency, amplitude, wave shape and voltage connected to said primary windings for inducing magnetic flux in said cores with the aligned ends having like polarity;
   respective pickup windings around the ends of said cores connected with each other in series;
   respective reference windings around the central portions of said cores connected together in series;
   an autotransformer having a winding and an arm adjustable along its winding;
   said pickup windings and said reference windings being connected to the winding of said autotransformer to transmit opposing signals thereto; and
   a recorder connected to said pickup windings and said arm for indicating magnitude of signals induced in said pickup windings and transmitted through said autotransformer;
   adjustment of said arm enabling said autotransformer to transmit a null signal to said recorder in the absence of a specimen.

References Cited
UNITED STATES PATENTS

| 2,467,211 | 4/1949 | Hornfeck | 324—36 |
| 2,503,247 | 4/1950 | Daum et al. | 324—34 |
| 2,842,737 | 7/1958 | Zoltan | 324—34 |
| 2,844,788 | 7/1958 | Callender | 324—34 |
| 2,942,177 | 6/1960 | Neumann et al. | 324—37 |
| 3,049,665 | 8/1962 | Hummel | 324—36 |

RUDOLPH V. ROLINEC, *Primary Examiner.*

A. E. SMITH, *Assistant Examiner.*

U.S. Cl. X.R.
324—41, 45